Patented Jan. 16, 1951

2,538,008

UNITED STATES PATENT OFFICE 2,538,008

DIALKYLAMINOBENZYLIDENE DYES

Grafton H. Keyes and Leslie G. S. Brooker, Rochester, N. Y., assignors to Eastman Kodak Company, Rochester, N. Y., a corporation of New Jersey No Drawing. Application September 24, 1949,
Serial No. 117,709

16 Claims. (Cl. 260—465)

This invention relates to dialkylaminobenzylidene dyes and to a process for preparing the same.

A number of dyes have been proposed for the preparation of filter layers in photographic elements. However, but a relatively few of these dyes are completely satisfactory, because the dyes are not completely and permanently bleached during the developing process. In many cases, there remains a more or less strong coloration or the coloration reappears, or is strengthened during the subsequent drying.

Examples of dyes which do not bleach completely during the developing process are those dialkylaminobenzylidene dyes which can be represented by the following general formula:

I 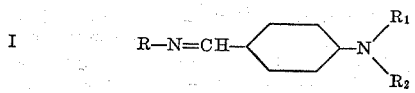

II 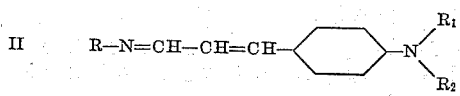

and

III 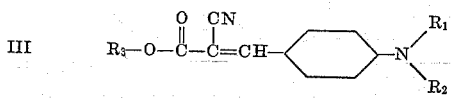

wherein $R_1$, $R_2$ and $R_3$ each represents an alkyl group, R represents a monovalent organic radical.

We have now found new dialkylaminobenzylidene dyes which bleach readily when exposed photographic silver halide materials comprising them are developed. It is, accordingly, an object of our invention to provide new dialkylaminobenzylidene dyes. A further object is to provide a process for preparing these dyes. Still further objects will become apparent hereinafter.

The new dialkylaminobenzylidene dyes of our invention can be represented by the following general formula:

IV 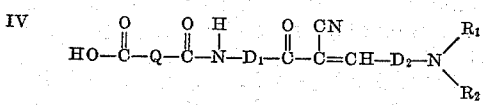

wherein $D_1$ and $D_2$ each represents a p-arylene group of the benzene series, e. g. p-phenylene, etc., Q represents a divalent hydrocarbon radical containing from 2 to 3 carbon atoms or an o-arylene group of the benzene series, e. g. ethylene, vinylene, propylene, trimethylene, o-phenylene, etc., and $R_1$ and $R_2$ each represents an alkyl group, e. g. methyl, ethyl, n-propyl, n-butyl, etc.

In accordance with our invention, we prepare the dyes represented by the above Formula IV by reacting an amino compound selected from those represented by the following general formula:

V 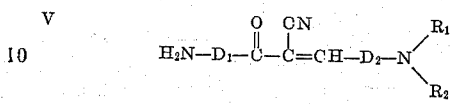

wherein $D_1$, $D_2$, $R_1$ and $R_2$ have the values given above, with an anhydride of a dibasic carboxylic acid selected from those represented by the following general formula:

VI 

wherein Q has the value given above, in the presence of a heterocyclic base of the pyridine series.

The reaction is accelerated by heat and is advantageously carried out at a temperature of from 70° to 120° C., although higher or lower temperatures can be used.

The dyes are obtained in the form of their pyridine salts from which the dyes are freed by treating the salts with an acid, e. g. hydrochloric acid, hydrobromic acid, sulfuric acid, phosphoric acid, sulfamic acid, trichloracetic acid, etc.

Typical of the starting dialkylaminobenzylidene compounds represented by Formula V above are: α - (p-aminobenzoyl) - α - (diethylaminobenzylidene)acetonitrile, α - (p-aminobenzoyl) - α - (p-di-n-propylaminobenzylidene)acetonitrile, α - (p-aminobenzoyl)-α-(p-di-n-butylaminobenzylidene)acetonitrile, α - (p-aminobenzoyl) - α - (dimethylaminobenzylidene)acetonitrile, etc.

Typical of the anhydrides represented by Formula VI above are: succinic anhydride, maleic anhydride, glutaric anhydride, pyrotartaric anhydride, phthalic anhydride (i. e. the anhydride of 1,2 - benzenedicarboxylic acid), 3 - chlorophthalic anhydride, 4-chlorophthalic anhydride, 3-methylphthalic anhydride, 4-methylphthalic anhydride, etc.

Typical bases of the pyridine series are: pyridine, α-picoline, β-picoline, γ-picoline, 2,3-lutidine, 2,4-lutidine, 2,5-lutidine, 2,6-lutidine, 3,4-lutidine, 3,5-lutidine, etc.

The following examples will serve to illustrate further the manner of practicing our invention.

*Example 1.*—α - [p - (β-Carboxypropionamido)-benzoyl] - α - (p - diethylaminobenzylidene)-acetonitrile

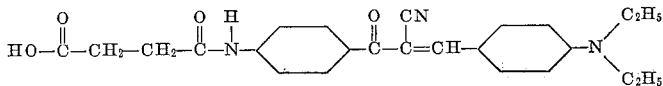

3.2 g. (1 mol.) of α-(p-aminobenzoyl)-α-(p-diethylaminobenzylidene)acetonitrile, 1.5 g. (1 mol. + 50% excess) succinic anhydride and 15 cc. of pyridine were refluxed together for one hour. The cooled reaction mixture was poured into about 200 cc. of cold water and the aqueous solution made acid (to neutralize the excess pyridine and to free the dialkylaminobenzylidene dye from its pyridine salt) with hydrochloric acid, whereupon the dialkylaminobenzylidene dye precipitated. The dye was allowed to settle and the aqueous liquors were decanted therefrom. The dye was stirred with a little methyl alcohol until it became crystalline. The dye was twice recrystallized from methyl alcohol and obtained as orange crystals which melted at 194 to 196° C. with decomposition.

*Example 2.*—α - [p - (o - Carboxybenzamido)-benzoyl] - α - (p - diethylaminobenzylidene) - acetonitrile

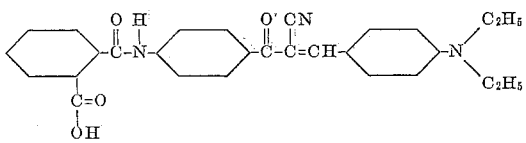

3.2 g. (1 mol.) of α-(p-aminobenzoyl)-α-(p-diethylaminobenzylidene)acetonitrile, 1.5 g. (1 mol.) of phthalic anhydride and 15 cc. of pyridine were heated together for one hour at steam bath temperature. The reaction mixture was then poured into about 200 cc. of cold water and made acid with hydrochloride acid. The crude dye precipitated and was isolated as described in Example 1. After two recrystallizations from methyl alcohol, the dye was obtained as brownish crystals melting at 182 to 184° C. with decomposition.

The α - (p - aminobenzoyl) - α - (p - diethylaminobenzylidene)acetonitrile employed in the above Examples 1 and 2 was prepared as follows:

1.6 g. (1 mol.) of p-aminobenzoylacetonitrile, 1.75 g. (1 mol.) of p-diethylaminobenzaldehyde and 25 cc. of absolute ethyl alcohol were heated under a reflux condenser. Two drops of piperidine were added to the mixture which was then refluxed for 3 hours. Upon chilling the reaction mixture the p-aminobenzoyldialkylaminobenzylidene compound separated out. After two recrystallizations from methyl alcohol, it was obtained as orange-brown crystals melting at 144° to 147° C. with decomposition.

*Example 3.*—α - [p - (β - Carboxypropionamido)-benzoyl] - α - (p - di - n - propylaminobenzylidene) acetonitrile

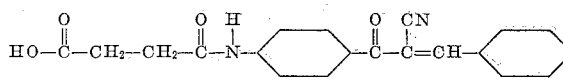

3.5 g. (1 mol.) of α-(p-aminobenzoyl)-α-(p-di-n-propylaminobenzylidene)acetonitrile, 1.5 g. (1.5 mol.) of succinic anhydride and 15 cc. of pyridine were heated for one hour at steam bath temperature. The reaction mixture was poured into about 200 cc. of cold water and made acid with hydrochloric acid. The crude dye precipitated and was isolated as in Example 1. After two recrystallizations from methyl alcohol, the dye was obtained as orange crystals melting at 184 to 186° C. with decomposition.

The α - (p - aminobenzoyl) - α - (p - di - n - propylaminobenzylidene)acetonitrile employed in the above Example 3 was prepared as follows:

8 g. (1 mol.) of p-aminobenzoylacetonitrile, 10.25 g. (1 mol.) of p-di-n-propylaminobenzaldehyde, 1000 cc. of absolute ethyl alcohol and 4 drops of piperidine were refluxed together for a period of three hours. The p-aminobenzoyldialkylaminobenzylidene compound separated out upon chilling the reaction mixture. It was filtered off and twice recrystallized from methyl alcohol, whereupon it was obtained as brownish-orange crystals melting at 148° to 150° C. with decomposition.

*Example 4.*—α - [p - (β - Carboxypropionamido)-benzoyl] - α - (p - di - n - butylaminobenzylidene)-acetonitrile 3.75 g. (1 mol.) of α-(p-aminobenzoyl)-α-(p-di-n-butylaminobenzylidene)acetonitrile, 1.5 g. (1 mol. + 50% excess) of succinic anhydride and 15 cc. of pyridine were heated at steam bath temperature for one hour. The cooled reaction mixture was poured into about 200 cc. of cold water and the aqueous mixture made acid with hydrochloric acid. The crude dye precipitated and was isolated as in Example 1. After two recrystallizations from methyl alcohol, it was obtained as orange crystals melting at 164° to 166° C. with decomposition.

*Example 5.*—α - [p - (β - Carboxyacrylamido) - benzoyl] - α - (p - di - n - butylaminobenzylidene)-acetonitrile

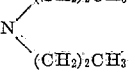

3.75 g. (1 mol.) of α-(p-aminobenzoyl)-α-(p-di-n-butylaminobenzylidene)acetonitrile, 1.5 g. (1 mol. + 50% excess) of maleic anhydride and 15 cc. of pyridine were heated at steam bath temperature for one hour. After cooling, the reaction mixture was diluted with 200 cc. of cold water and then made acid with hydrochloric acid. The dye separated as a sticky mass. The aqueous liquors were decanted and the dye stirred with a little methyl alcohol until obtained in a crystalline form. It was twice recrystallized from methyl alcohol and obtained as brownish crystals melting at 190° to 192° C. with decomposition.

The α - (p - aminobenzoyl) - α - (p - di - n - butylaminobenzylidene)acetonitrile employed in the foregoing Examples 4 and 5 was prepared as follows:

8 g. (1 mol.) of p-aminobenzoylacetonitrile, 11.65 g. (1 mol.) of p-di-n-butylaminobenzaldehyde, 100 cc. of absolute ethyl alcohol and 4 drops of piperidine were refluxed together for a period of three hours. Upon chilling the reaction mixture the p-aminobenzoyldialkylaminobenzylidene compound separated. After two recrystallizations from methyl alcohol, it was obtained as brown crystals melting at 115° to 117° C. with decomposition. Using p-dimethylaminobenzaldehyde, α-(p-aminobenzoyl)-α-(p-dimethylaminobenzylidene)acetonitrile can be similarly prepared.

In any of the foregoing Examples 1, 2, 3, 4 and 5, the succinic anhydride, the phthalic anhydride or the maleic anhydride can be replaced with molecularly equivalent amounts of glutaric anhydride, pyrotartaric anhydride, chlorophthalic anhydride or methylphthalic anhydride to form dyes in accordance with our invention.

In addition to being useful in the preparation of photographic materials containing filters, our new dyes are useful, in their ammonium, sodium or potassium salt forms, as dyes for natural silk and for wool.

Alkali metal (e. g. sodium or potassium) salt forms of our new dyes can be made by dissolving the free acid form of the dye in water containing an alkali metal hydroxide. By treatment of a solution of such an alkali metal salt form with a solution of a salt of another metal, e. g. the lead salt of the dye can be precipitated. Ammonium salt forms can be prepared by dissolving the dyes in ethyl alcohol containing ammonia, methylamine, diethylamine, triethylamine, ethanolamine, ethylenediamine, pyridine, piperidine, N-methylpiperidine, etc. All of these salts are formed by reaction of the carboxylic acid group in our new dyes with the base.

Photographic materials containing as filters the dyes disclosed herein are described in the copending application of Grafton H. Keyes, Arthur H. Herz and Leslie G. S. Brooker, Serial No. 117,710, filed of even date herewith.

p-Aminobenzoylacetonitrile can be prepared as follows: 10 g. of p-chloroacetylaniline (Kunckell, Ber. 33, 2644 (1900)) were dissolved in 100 cc. of

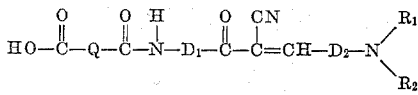

methyl alcohol. To this solution were added 19 g. of potassium cyanide dissolved in 50 cc. of water. A vigorous reaction took place. The reaction mixture was acidified with acetic acid, whereupon p-aminobenzoylacetonitrile separated out. It was filtered off and washed with water. Upon recrystallization from water, the compound was obtained as colorless crystals melting at 160° C.

What we claim as our invention and desire to be secured by Letters Patent of the United States is:

1. The dialkylaminobenzylidene dyes which are represented by the following general formula:

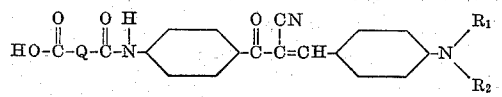

wherein $D_1$ and $D_2$ each represents a p-arylene group of the benzene series, Q represents a divalent radical selected from the group consisting of a divalent hydrocarbon radical containing from 2 to 3 carbon atoms and an o-arylene group of the benzene series, and $R_1$ and $R_2$ each represents an alkyl group, and the carboxylic salts of said dialkylaminobenzylidene dyes.

2. The dialkylaminobenzylidene dyes which are represented by the following general formula:

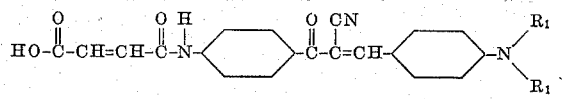

wherein Q represents a divalent radical selected from the group consisting of a divalent hydrocarbon radical containing from 2 to 3 carbon atoms and an o-arylene group of the benzene series, and $R_1$ and $R_2$ each represents an alkyl group.

3. The dialkylaminobenzylidene dyes which are represented by the following general formula:

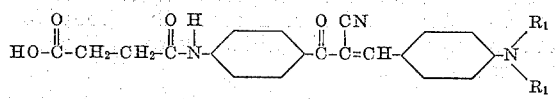

wherein $R_1$ represents a primary alkyl group containing from 1 to 4 carbon atoms.

4. The dialkylaminobenzylidene dyes which are represented by the following general formula:

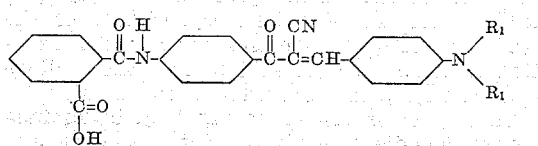

wherein $R_1$ represents a primary alkyl group containing from 1 to 4 carbon atoms.

5. The dialkylaminobenzylidene dyes which are represented by the following general formula:

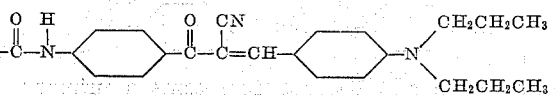

wherein $R_1$ represents a primary alkyl group containing from 1 to 4 carbon atoms.

6. The dialkylaminobenzylidene dye which is represented by the following formula:

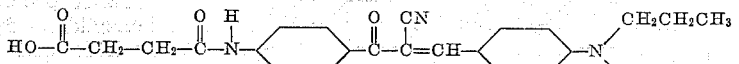

7. The dialkylaminobenzylidene dye which is represented by the following formula:

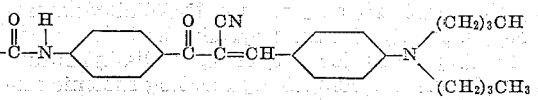

8. The dialkylaminobenzylidene dye which is represented by the following formula:

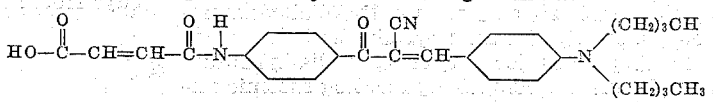

9. A process for preparing a dialkylaminobenzylidene dye comprising reacting an anhydride selected from the group of anhydrides represented by the following general formula:

wherein Q represents a member selected from the group consisting of a divalent hydrocarbon radical containing from 2 to 3 carbon atoms, and an o-arylene group of the benzene series, with an amino compound selected from the group of amino compounds represented by the following general formula:

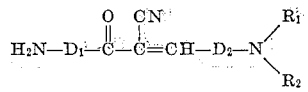

wherein $D_1$ and $D_2$ each represents a p-arylene group of the benzene series, and $R_1$ and $R_2$ each represents an alkyl group, in the presence of a heterocyclic base of the pyridine series.

10. A process for preparing a dialkylaminobenzylidene dye comprising reacting an anhydride selected from the group of anhydrides represented by the following general formula:

wherein Q represents a member selected from the group consisting of a divalent hydrocarbon radical containing from 2 to 3 carbon atoms, and an o-arylene group of the benzene series, with an amino compound selected from the group of amino compounds represented by the following general formula:

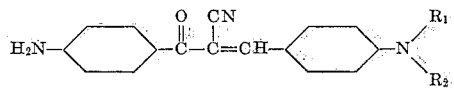

wherein $R_1$ and $R_2$ each represents an alkyl group, in the presence of a heterocyclic base of the pyridine series, and treating the resulting reaction mixture with an acid to free the dialkylaminobenzylidene dye from its pyridine salt.

11. A process for preparing a dialkylaminobenzylidene dye comprising reacting succinic anhydride with an amino compound selected from the group of amino compounds represented by the following general formula:

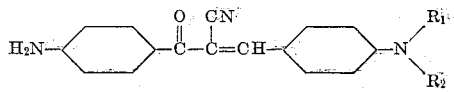

wherein $R_1$ and $R_2$ each represents a primary alkyl group containing from 1 to 4 carbon atoms, in pyridine, and treating the resulting reaction mixture with an acid to free the dialkylaminobenzylidene dye from its pyridine salt.

12. A process for preparing a dialkylaminobenzylidene dye comprising reacting succinic anhydride with α-(p-aminobenzoyl)-α-(p-di-n-propylaminobenzylidene)acetonitrile, in pyridine, and treating the resulting reaction mixture with hydrochloric acid to free the dialkylaminobenzylidene dye from its pyridine salt.

13. A process for preparing a dialkylaminobenzylidene dye comprising reacting phthalic anhydride with an amino compound selected from the group of amino compounds represented by the following general formula:

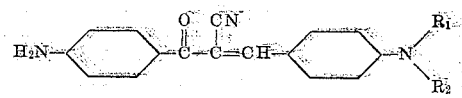

wherein $R_1$ and $R_2$ each represents a primary alkyl group containing from 1 to 4 carbon atoms, in pyridine, and treating the resulting reaction mixture with an acid to free the dialkylaminobenzylidene dye from its pyridine salt.

14. A process for preparing a dialkylaminobenzylidene dye comprising reacting phthalic anhydride with α-(p-aminobenzoyl)-α-(p-diethylaminobenzylidene)acetonitrile, in pyridine, and treating the resulting reaction mixture with hydrochloric acid to free the dialkylaminobenzylidene dye from its pyridine salt.

15. A process for preparing a dialkylaminobenzylidene dye comprising reacting maleic anhydride with an amino compound selected from the group of amino compounds represented by the following general formula:

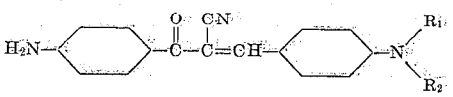

wherein $R_1$ and $R_2$ each represents a primary alkyl group containing from 1 to 4 carbon atoms, in pyridine, and treating the resulting reaction mixture with an acid to free the dialkylaminobenzylidene dye from its pyridine salt.

16. A process for preparing a dialkylaminobenzylidene dye comprising reacting maleic anhydride with α-(p-aminobenzoyl)-α-(p-di-n-butylaminobenzylidene)acetonitrile, in pyridine, and treating the resulting reaction mixture with hydrochloric acid to free the benzylidene dye from its pyridine salt.

GRAFTON H. KEYES.
LESLIE G. S. BROOKER.

No references cited.